United States Patent
Lu et al.

[11] Patent Number: 5,870,164
[45] Date of Patent: Feb. 9, 1999

[54] POLARIZATION DEPENDENT TWISTED NEMATIC LIQUID CRYSTAL DEVICES FOR REFLECTIVE SPATIAL LIGHT MODULATORS

[75] Inventors: Minhua Lu, Mohegan Lake; Robert Lee Melcher, Mt. Kisco; James Lawrence Sanford, Chappaqua; Kei-Hsiung Yang, Katonah, all of N.Y.

[73] Assignee: International Business Machines Corporation, Armonk, N.Y.

[21] Appl. No.: 879,843

[22] Filed: Jun. 20, 1997

[51] Int. Cl.[6] ................................................. C09K 19/02
[52] U.S. Cl. ............................................ 349/180; 349/181
[58] Field of Search ..................................... 349/180, 181

[56] References Cited

U.S. PATENT DOCUMENTS

| | | | |
|---|---|---|---|
| 4,019,807 | 4/1977 | Boswell et al. | 350/160 |
| 4,378,955 | 4/1983 | Bleha, Jr. et al. | 350/334 |
| 4,426,133 | 1/1984 | Funada et al. | 350/334 |
| 4,609,255 | 9/1986 | Leenhouts et al. | 350/341 |
| 4,896,947 | 1/1990 | Leenhouts | 350/337 |
| 4,952,030 | 8/1990 | Nakagawa et al. | 349/180 |
| 4,999,619 | 3/1991 | Te Velde | 340/784 |
| 5,004,324 | 4/1991 | Leenhouts et al. | 349/180 |
| 5,105,289 | 4/1992 | Sonnehara et al. | 359/70 |
| 5,139,340 | 8/1992 | Okumura | 359/63 |
| 5,726,723 | 3/1998 | Wang et al. | 349/75 |

OTHER PUBLICATIONS

Kahn et al. (1972) "Electric–Field–Induced Orientational Deformation of Nematic Liquid Crystals: Tunable Birefringence", *Applied Physical Letters,* vol. 20, No. 5, pp. 199–201.

Soref et al. (1972) "Electrically Controlled Birefringence of Thin Nematic Films", *J. of Applied Physics,* vol. 43, No. 5, pp. 2020–2037.

Sonehara et al. (1989) "A New Twisted Nematic ECB (TN–ECB) Mode for a Reflective Light Valve" *Japan Display,* pp. 192–195.

Grinberg et al. (1975) "A New Real–Time Non–Coherent to Coherent Light Image Converter The Hybrid Field Effect Liquid Crystal Light Valve" *Optical Engineering,* vol. 14, No. 3, pp. 217–225.

Glueck et al. (1992) "Color–TV Projection with Fast–Switching Reflective HAN–Mode Light Valves" *SID 92 Digest,* pp. 277–279.

Glueck et al. (1993) "Late–News paper: Improvement in Light Efficiency of a–Si:H TFT–Addressed Reflective $\lambda/4$–HAN–Mode Light Valves for Color TV Projection" *SID 93 Digest,* pp. 299–302.

Wu et al. (1996) "Mixed–Mode Twisted Nematic Liquid Crystal Cells for Reflective Displays" *Appl. Phys. Lett.,* vol. 68, No. 11, pp. 1455–1457.

Howard et al. "Active Matrix LCDs", Seminar Lecture Note of the 1989 SID International Symposium, pp. F–2/3–F–2/31.

*Primary Examiner*—William L. Sikes
*Assistant Examiner*—Tarifur R. Chowdhury
*Attorney, Agent, or Firm*—Scully, Scott, Murphy & Presser; David M. Shofi

[57] ABSTRACT

A twisted nematic liquid crystal (TNLC) cell used in reflective spatial light modulators (SLMs) of displays is disclosed. The TNLC cell includes front and rear substrates, and a TNLC material having a thickness d and a left-handed or right-handed twist angle $\phi$. The TNLC material is sandwiched between the front and rear substrates, and the twist angle $\phi$ is approximately from 46° to 62°. A direction of directors of the TNLC material located nearest the front substrate forms an initial angle $\beta$ with a direction of linearly polarized light incident thereon. The initial angle $\beta$ is approximately from −6° to 60°. A birefringence $\Delta n$ of the TNLC material times the thickness d is between approximately $0.7\lambda$ to $1.25\lambda$, where $\lambda$ is a wavelength of light incident on the front substrate.

23 Claims, 8 Drawing Sheets

POLARIZATION DEPENDENT TWISTED NEMATIC LIQUID CRYSTAL DEVICES FOR REFLECTIVE SPATIAL LIGHT MODULATORS

BACKGROUND OF THE INVENTION

1. Field of the Invention

The present invention is directed to a polarization dependent liquid crystal display using reflective spatial light modulators, and more particularly, to a display having reflective spatial light modulators with twisted nematic liquid crystal devices that exhibit polarization dependence on the incident light.

2. Discussion of the Prior Art

Increasingly, cathode ray tube (CRT) displays are being replaced with liquid crystal displays (LCDs). LCDs use spatial light modulators (SLMs) to form images. One type of an LCD is an active-matrix-driven liquid crystal display (AMLCD) that uses SLMs. The SLMs may be either transmissive or reflective.

FIG. 1 shows a basic structure of a display 100 having conventional active-matrix-driven liquid crystal transmissive spatial light modulators (AM LC SLMs). The display 100 has a back polarizer 110 and a front polarizer 115 which faces a viewer. Front and back glass substrates 120, 125 are located between, and next to, the back and front polarizers 110, 115, respectively. The AM LC SLMs, both transmissive and reflective, typically have repetitive unit cells or picture elements (pixels) 130. FIG. 1 shows 9 pixels in a 3×3 pixel array.

An array of transistors 135, such as field effect transistors (FETs), is formed on the back glass substrates 125. Each FET 135 in the array has its own transparent conductive electrode 140, referred to as a pixel electrode 140. Each FET 135 and pixel electrode 140 are part of one pixel (or subpixel) of an image formed on the front polarizer 115 of the display 100. Collectively, the pixel electrodes 140 form an array of pixel electrodes.

On the front substrate 120, a transparent conductive front electrode 145 is formed, which is common to all the FETs 135 in the transistor array. The front electrode 145 is referred to as a common counter-electrode. Optional color filters 150 arranged in an array may be formed between the front substrate 120 and the common counter-electrode 145. The color filters include red, green and blue filters, where each pixel has its own filter.

A liquid crystal (LC) medium 155 is sandwiched between the transparent conductive pixel and common counter-electrodes 140, 145. Back and front alignment layers (not shown), such as rubbed polyimide films, are formed between the LC medium 155, and the pixel and common electrodes 140, 145, respectively. A back-light source 160 illuminates the back of the display panel 100, where light rays 165 from the back-light source 160 are incident on the back polarizer 110.

Each FET 135 is an on/off transistor switch that supplies a voltage to the pixel electrode 140 in the ON condition. This in turn generates an electric field between the pixel electrode 140 and the common counter-electrode 145. The electric field aligns molecules of the LC medium 155. This alignment causes light passing through the LC medium 155, from the back-light source 160, to form an image on a screen (not shown) located between the front polarizer 115 and a viewer (not shown).

Instead of transmissive SLMs, where the pixel electrodes 140 are transparent, reflective SLMs may be used having reflective pixel electrodes. For reflective AM LC SLMs having reflective pixel electrodes, the transparent conductive pixel electrode 140 is replaced with a reflective metal electrode. Each metal pixel electrode of a reflective SLM typically occupies a larger area than a corresponding transparent pixel electrode 140 of a transmissive SLM. The additional area of the reflective metal pixel electrode covers the FET 135.

For reflective AM LC SLMs, there is no need for the back-light source 160 used with transmissive SLMs. Instead, ambient light or another light source illuminates the display panel from the front of the panel, e.g., from the top or front polarizer 115 shown in FIG. 1. A more detailed description of a display having reflective AM LC SLMs is given in connection with FIG. 7.

FIG. 2 shows an equivalent circuit 200 of one of the pixels 130 shown in FIG. 1. Although FIG. 1 is a display using transmissive SLMs, FIG. 2 is an equivalent circuit 200 for both transmissive and reflective SLMs. A display using reflective SLMs is shown in FIGS. 3 and 4.

As shown in FIG. 2, the gate 205 of the FET 135 is connected to a gate bus line 210, while the FET drain 215 is connected to a data bus line 220. The source 225 of the FET 135 is connected to the pixel electrode 140, which is shown in FIG. 1 as the transparent pixel electrode, and is also shown in FIGS. 3, 4 as a reflective pixel electrode 140'. The LC medium 155 of FIG. 1 is equivalent to a capacitor 230, which has one terminal connected to the pixel electrode 140 and another terminal connected to the transparent common counter-electrode 145.

A storage capacitor 240 provides parallel capacitance to the LC capacitor 230. The storage capacitor 240 is terminated on a common line 260, which is common to all the storage capacitors 240 in the display. Another alternate design for a storage capacitor is to replace the storage capacitor 240 by a storage capacitor 250, shown as dashed lines in FIG. 2, which is connected from the pixel electrode 140 to an adjacent pixel gate bus line 210'. The adjacent pixel data bus line is shown as reference numeral 220' in FIG. 2.

When a voltage below a threshold voltage is applied on the gate bus line 210, the FET 135 is in an OFF-condition (OFF state). The OFF FET 135 acts as an open switch and separates the data bus line 220 from the pixel electrode 140. This isolates the potentials on data bus line 220 and the pixel electrode 140 from each other.

When a voltage larger than the threshold voltage is applied to the gate bus line 210, the FET 135 is turned ON (ON state) and has a low impedance between its source 225 and drain 215. The ON FET 135 acts as a closed switch and connects the data bus line 220 to the pixel electrode 140. This transfers the data voltage on the data bus line 220 to the pixel electrode 140.

In the ON state, varying the data voltage on the data bus line 220 varies the voltage applied to the pixel electrode 140. The different voltages applied to the pixel electrode 140 variably turn on the liquid crystal cell 230. Varying the pixel voltage (on the pixel electrode 140) varies the intensity of light as it passes through the liquid crystal cell 155 shown in FIGS. 1, 3, 4, and represented as the LC capacitor 230 in FIG. 2. This results in displaying different scales of gray color on the front polarizer 115 shown in FIG. 1.

FIGS. 3 and 4 show cross sectional and perspective views of a conventional reflective display 300 using an array of reflective liquid crystal spatial light modulators (LC SLMs). The array of FETS 135 are formed on the substrate 125, which is a silicon (Si) wafer, for example. Each FET 135 drives one of the reflective SLMs in the SLM array as described below.

FIG. 3 is a cross sectional view of a single reflective liquid crystal light valve or SLM of the conventional reflection liquid crystal (LC) display 300. The FET 135 is formed between field oxide regions 305 on the semiconductor Si substrate 125. The field oxide regions 305 separate the FET 135 from other FETs or devices formed on the substrate 125. The FET 135 has source and drain regions 225, 215 which are formed in the substrate 125. The source and drain regions 225, 215 are separated by a channel region 310.

Over the channel region 310, a gate insulating film 315 is formed. Illustratively, the gate insulating film 315 is an $SiO_2$ layer having a thickness which is approximately from 150 to 500 angstroms (Å). A polysilicon gate electrode 205, e.g., having a thickness of approximately 0.44 micron ($\mu$m), is formed over the gate insulating film 315.

A layer of dielectric or insulator material, such as an $SiO_2$ layer 320, is formed over the FET 135 and field oxide regions 310. The storage capacity line 260, also shown in FIG. 2, is formed over a portion of the $SiO_2$ layer 320 so that the storage capacity line 260 extends over portions of the source 225 and the field oxide regions 305 adjacent thereto. A second $SiO_2$ layer 325 is formed over the storage capacity line 260 and exposed portions of the first $SiO_2$ layer 320. The two $SiO_2$ layers 320, 325 act as inter-layer insulating films.

First and second via holes are formed extending through both $SiO_2$ layers 320, 325 to expose portions of the source and drain regions 225, 215, respectively. A conductive source line 330 and the conductive data bus line 220, which is also shown in FIG. 2, are formed in the first and second via holes, respectively. The conductive source and data lines 330, 220 extend over portions of the second $SiO_2$ layer 325 and are electrically connected to the source and drain regions 225, 215, respectively. Illustratively, the source and data lines 330, 220 are aluminum (Al) and have a thickness 335 of approximately 0.7 microns.

A third silicon oxide $SiO_2$ film 340, acting as an inter-layer insulating film, is formed over the source and data lines 330, 220 and exposed portions of the second silicon oxide $SiO_2$ layer 325. Over the third oxide $SiO_2$ layer 340, an optical absorbing layer 345 is formed. The optical absorbing layer 345, which has a thickness of approximately 160 nano-meters (nm), is formed of three layers that are laminated over each other in the following order: A titanium (Ti) layer having a thickness of approximately 100 Å; an aluminum (Al) layer having a thickness of approximately 1000 Å; and a titanium nitride (TiN) layer having a thickness of approximately 500 Å.

Laminating these three layers so as to form the optical absorbing layer 345 with a thickness of approximately 160 nm, reduces reflection of light, e.g., having a wavelength from 345 to 700 Å, that enters the optical absorbing layer 345 to result in a reflection factor of approximately 25%. The light that enters the optical absorbing layer 345 is shown as arrow 350 in FIG. 3.

In addition, the optical absorbing layer 345 prevents the light 350 from being transmitted to the FET 135 to result in a transmission factor of approximately 0%. The optical absorbing layer 345 improves contrast of images and prevents leakage currents in the FET 135.

A silicon nitride film 355, having a thickness of approximately from 400 to 500 nm, is formed on the optical absorbing layer 345. Next, an Al light reflecting film 140' having a thickness of approximately 150 nm, also shown in FIG. 2 as reference numeral 140 and referred to as the pixel electrode, is formed over the silicon nitride film 355.

A via hole is formed to expose a portion of the source line or electrode 330 of the FET 135. The via hole penetrates through the light reflecting film or pixel electrode 140', the silicon nitride film 355, the optical absorbing layer 345, and the third silicon oxide $SiO_2$ film 340.

A conducting stud 360, such as a tungsten (W) stud, is formed in the via by a chemical vapor deposition CVD method, for example. The tungsten stud 360 electrically connects the source line or electrode 330 to the light reflecting film or pixel electrode 140'. To prevent electrical connection to the tungsten stud 360, the optical absorbing layer 345 is removed from around the tungsten stud 360.

As more clearly shown in the perspective view of the display 300 in FIG. 4, the light reflecting film or pixel electrode 140' is separated from adjacent pixel electrodes 140'. Illustratively, the reflective pixel electrodes 140' are spaced apart from each other at a specified interval of about 0.5 to 1.7 microns. Each reflective pixel electrode 140', along with its associated FET 135, form a subpixel. For example, three subpixels for red, green and blue components of light form a pixel.

At selected locations of the array of subpixels, pillar-shaped spacers 365 are formed in the space that separates the reflective pixel electrodes 140' from each other. Illustratively, the pillar-shaped spacers 365 are $SiO_2$ spacers having a width 370 of approximately 1 to 5 microns. The height 375 of each spacer 365 is determined according to the desired cell gap, which is filled with the liquid crystal (LC) 155. The spacers 365 are provided throughout the substrate at specified intervals in order to retain the desired cell gap or thickness d of the LC material 155.

Note, the width 370 of each spacer 365, which is about 1–5$\mu$, is the same order as the distance of about 0.5–1.7$\mu$ that separates the reflective pixel electrode 140'. This provides minimum overlap of the spacers 365 with the reflective pixel electrode 140', which in turn minimizes any reduction of the numerical aperture of each subpixel resulting from the pillar-shaped spacer 365.

The counter-electrode 145, which is formed on the glass protect substrate 120, is attached over the spacers 365. The counter-electrode 145 and glass substrate 120 are also shown in FIG. 1. The glass protect substrate 120 is the front portion of the display 300, i.e., the portion facing a viewer. As described in connection with FIG. 1, the counter-electrode 145 is transparent and common to all the pixels. Illustratively, the counter-electrode 145 is an indium titanium oxide (ITO) transparent electrode.

Attaching the counter-electrode 145 over the pillar-shaped spacers 365 forms the cell gap. The liquid crystal (LC) layer 155, in which a liquid crystal material is sealed, is formed in the cell gap between the light reflecting film or pixel electrode 140' and the counter-electrode 145. Orienting films (not shown) are also formed over the pixel electrode 140' and the counter-electrode 145 to orient the liquid crystal molecules.

Illustratively, as shown in FIG. 4, each pixel electrode 140', which defines a subpixel, has a square shape with a side of approximately 17 microns. To form the display 300, the subpixels are arranged in a matrix or array of 1280 rows and 1600 columns, for example.

In the reflective liquid crystal light valve or SLM, comprising the LC material 155 sandwiched between the common transparent ITO counter-electrode 145 and the reflective pixel electrode 140', light 350 entering from the glass protect substrate 120 reflects from the reflective pixel electrode 140'. The pixel electrode 140' also functions as a display electrode for applying a voltage to the liquid crystal layer 155. The FET 135 functions as a switching element for providing a signal voltage from the data line 220 to the pixel electrode 140', when a control voltage on the gate 205 turns on the FET 135, as described in connection with FIG. 2.

An image is projected from the front glass substrate 120, or formed thereon, when the light 350 that enters the front glass protect substrate 120 travels through LC material 155 and reflects back to the front glass substrate 120. This light is reflected from the reflective pixel electrode 140'. Depending on the voltage of the pixel electrode 140', which voltage affects alignment of the LC material 155, the light reflected from the reflective pixel electrode 140', after exiting the front glass protect substrate 120, either passes through an analyzer (not shown) to form an image on a screen, or is blocked by the analyzer from reaching the screen.

The light polarization-rotating properties of the LC material 155 results from varying the direction of the liquid crystal molecules (not shown) in accordance to a voltage applied between the reflective pixel electrode 140' and the transparent ITO common counter-electrode 145. As described in connection with FIG. 2, this voltage is supplied from the data bus line 220 to the pixel electrode 140' when the FET 135 is turned on in response to a control signal on the gate bus line 210 (FIG. 2), which is connected to the gate 205 of the FET 135.

Depending on the voltage applied to the pixel electrode 140', the directors' orientation of the LC material 155 changes. This varies the state of the polarization of light that is incident on the pixel electrode 140', reflects therefrom, and exits the front glass protect substrate 120. Based on this variation of light polarization exiting the front glass protect substrate 120, an image is formed on a screen (similar to a screen 780 of FIG. 7) located between the front glass protect substrate 120 and a viewer.

Various types of polarization dependent conventional LC devices that are fabricated into reflective SLMs. According to the prior art, nematic liquid crystal (NLC) devices are used in reflective light valves for projection displays. These NLC devices require either a linearly-polarized or a randomly-polarized incident light beam.

The present invention concerns primarily with the case where the incident light on an LC device, having a reflective SLM, is linearly polarized. There are various commonly used NLC modes in reflective SLMs that require the incident light to be linearly polarized. The commonly used NLC modes requiring linearly polarized incident light include:

1. electro-control birefringence (ECB) mode with tilted homogeneous alignment;
2. deformation of aligned phase (DAP) mode;
3. hybrid-field-effect (HFE) mode;
4. 63.6° twist mode;
5. hybrid-aligned nematic mode (HAN); and
6. mixed TN (MTN) mode.

The first and second modes, i.e., the ECB and DAP modes, are described in the following references:

M. F. Shiekel and K. Fahrenschon, "Deformation of Nematic Liquid Crystals with Vertical Orientation in Electric Fields", Appl. Phys. Lett., Vol. 19, No. 10, pg. 391 (1971);

F. J. Kahn, "Electric-Field-Induced Orientation Deformation of Nematic Liquid Crystals: Tunable Birefringence", Appl. Phys. Lett., Vol. 20, pg. 199 (1972); and R. A. Soref and M. J. Rafuse, "Electrically Controlled Birefringence of Thin Nematic Films", J. Appl. Phys., Vol. 43, No. 5, pg. 2029 (1972).

The third or HFE mode is described in J. Grinberg, A. Jacobson, W. Bleha, L. Miller, L. Fraas, D. Boswell, and G. Myer. "A New Real-Time Non-Coherent to Coherent Light Image Converter—The Hybrid Field Effect Liquid Crystal Light Valve", Optical Engineering, Vol. 14, No. 3, pg. 217 (1975). The fourth or 63.6° twist mode is described in T. Sonehara and O. Okumura, "A New Twisted Nematic ECB (TN-ECB) Mode for a Reflective Light Valve", Japan Display 89, pg. 192 (1989). The fifth or HAM mode is described in J. Glueck, E. Lueder, T. Kallfass, and H.-U. Lauer, "Color-TV Projection with Fast-Switching Reflective HAN-Mode Light Valves", SID 92 DIGEST, pg. 277 (1992). The sixth or MTN mode is described in Shin-Tson Wu and Chiung-Sheng Wu, "Mixed-Mode Twisted Nematic Liquid Crystal Cells For Reflective Displays", Appl. Phys. Lett., Vol. 68, No. 11, pg. 1455 (1996).

Among these LC modes, the present invention primarily concerns with twisted nematic LC cells using nematic LC mixtures belonging to the family of HFE modes and having a positive dielectric anisotropy.

FIG. 5 shows a typical example of a conventional twisted nematic liquid crystal (TNLC) cell 500 used in reflective SLMs. The conventional TNLC cell 500 has a front substrate 505 and a rear substrate 510 to house a nematic LC medium 515 therebetween. The front and rear substrates 505, 510 are parallel to each other.

Between the front substrate 505 and the nematic LC medium 515, there are at least two layers of thin films (not shown). One of the two thin films is a transparent conducting electrode made of indium-tin-oxide (ITO), for example, and the other thin film is a front alignment layer made of organic material, such as polyimide. The polyimide alignment film is located between the ITO electrode and the LC medium 515 and aligns a boundary nematic LC director 520 along a specific direction 525. The boundary nematic LC director 520 is the LC director nearest the front alignment layer.

Similarly, between the rear substrate 510 and the nematic LC medium 515, there are at least two layers of thin films (not shown). The thin film adjacent the rear substrate 510 is a reflective conducting pixel electrode made of aluminum (Al) or its alloys, for example. The other thin film, located between the pixel electrode and the LC medium 515, is a rear alignment layer made of organic material, such as polyimide. This rear polyimide alignment film aligns a boundary nematic LC director 530 along a specific direction 535. The boundary nematic LC director 530 is the LC director nearest the rear alignment layer.

The nematic LC medium 515 has a total thickness, d, and the nematic LC directors twist along an axis 540 which is perpendicular to the planes of the front and rear substrates 505, 510. That is, moving along the axis 540 from the front substrate 505 toward the rear substrate 510, the TNLC directors twist by an acute twist angle φ from the direction 525 of the front boundary LC director 520 to the direction 535 of the rear boundary LC director 530. The twist angle φ is shown in FIG. 5, on the rear substrate 510, as the angle between the direction 535 of the rear boundary LC director 530 and a projection 525p, on the rear substrate 510, of the front boundary LC director's direction 525.

Upon application of a voltage across the front and rear electrodes, which creates an electric field across the LC material 515, the TNLC directors tilt. For example, instead of being in a plane parallel to the plane of the front substrate 505, the front boundary director 520 tilts by a tilt angle to be in a different plane than the front substrate plane.

Certain TNLC cells have a small pretilt angle α, e.g., below 15°. Note, the boundary LC directors 520 and 530, shown in FIG. 5, are tilted at a fixed pretilt angle α in the absence or presence of an electric field. This is because the boundary LC directors 520, 530 are strongly anchored on the substrate surfaces 505, 510.

FIG 5 also shows an incident light beam which is linearly polarized along a polarization direction 545 and has a central wavelength λ. The angle between the polarization direction 545 and the front boundary LC director 525 is referred to as the initial angle and is designated as β. The initial angle β is shown on the rear substrate 510 as the angle between the rear substrate projections 525p, 545p of the front boundary LC director 525 and the incident light polarization direction 545, respectively.

The sign of the initial angle β is positive along a clockwise direction from the rear substrate projection 525p of the front boundary LC director 525 to the direction 535 that defines the acute twist angle φ therebetween, as viewed from the front of the conventional TNLC cell 500. In the counter-clockwise direction from the front boundary LC director 525, as viewed from the front of the conventional TNLC cell 500, the initial angle β is negative. For example, the initial angle β is positive if it is an acute angle and lies within the twist angle φ, and negative if it lies at the opposite direction from the front boundary LC director 525 and outside of the twist angle φ.

In addition to the wavelength λ of the incident light, twist angle φ, and the thickness d of the TNLC cell 500, another important parameter is the birefringence Δn of the LC medium 515. The birefringence Δn is the difference between the refractive index of an extra-ordinary wave and the refractive index of an ordinary wave of the LC medium.

The electro-optical properties of the reflective TNLC cell 500 depend on the following parameters:

1. the twist angle φ;
2. the initial angle β, i.e., the angle between the direction 525 of the front LC direction 520 and the incident light polarization direction 545;
3. the pretilt angle α; and
4. a ratio involving the birefringence, the LC material thickness d, and the incident light wavelength λ as follows: dΔn/λ.

To optimize the TNLC cell 500 for the best electro-optical performance for a specific application, the following should be known:

1. whether the TNLC cell 500 is used in reflective or transmissive displays;
2. whether the polarizer that provides incident light to the TNLC cell and the analyzer that received light from the TNLC cell 500 is crossed or parallel; and
3. whether the cell is operated in the normally-white (NW) or the normally-black (NB) modes.

In the NW mode, the display is bright at field-off or low-field regions. By contrast, in the NB mode, the display is dark at field-on or high-field regions.

In summary, there are a total of seven parameters that define a specific embodiment associated with a TNLC cell 500, as shown in FIG. 5, belonging to the family of hybrid-field-effect mode TNLC cells. Table I has columns that list these seven parameters. The rows of Table I compare conventional displays having conventional TNLC cells with a display and TNLC cell of the present invention.

TABLE I

|  | φ | β | α | dΔn | polarizer/ analyzer | reflective or transmissive | NW or NB |
|---|---|---|---|---|---|---|---|
| Boswell | 45° | 0° | ~0° |  | crossed | reflective | NB |
| Bleha | 45° | 22.5° | ~0° | d ~ 2 μm | crossed | reflective | NB or NW |
| Leenhouts | 10 to 80° | 10 to −60° | ~0° | 0.2 to 0.7 μm | crossed | transmissive | NW |
| Velde | 0° |  | <15° | 0.5λ to 0.6λ | crossed or parallel | reflective | NW |
| Sonehara | 63.6° | 0° | ~0° | 0.33λ to 0.4λ | crossed or parallel | reflective | NB or NW |
| Okumura | 0.70° | 0° | ~0° | 0.2 to 0.7 μm | parallel | reflective | NW |
| present invention | 46 to 62° | −6 to 6° | <15° | 0.7λ to 1.25λ | crossed | reflective | NB |

The first row of Table I, referred to as Boswell, shows the seven parameters as described in U.S. Pat. No. 4,019,807, issued to D. D. Boswell et al., on Apr. 26, 1977, entitled "Reflective Liquid Crystal Light Valve with Hybrid Field effect Mode", hereinafter referred to as Boswell. Boswell did not specify the value for dΔn. However, a value for the thickness d is given as 2 μm, and less then 0.2 μm for Δd, the variation of thickness d. Boswell has a disadvantage of low brightness, only about 86% as stated on column 10, line 11.

The second row of Table I, referred to as Bleha, is described in U.S. Pat. No. 4,378,955, issued to W. P. Bleha et al., on Apr. 5, 1983, entitled "Method of and Apparatus for Multi-Mode Image Display with a Liquid Crystal Light Valve", hereinafter refer to as Bleha. Bleha is directed to a multi-mode image display without any disclosure or intention to optimize the brightness and the cell gap margin for easy manufacturability. The cell-gap margin, M, is defined as |Δd/d|, where ±Δd is the maximum cell gap or thickness variation from its thickness d. Because cell brightness and the cell gap margin are not optimized, Bleha has the disadvantages of low brightness and poor cell-gap margin.

The third row of Table I, referred to as Leenhouts, is described in U.S. Pat. No. 4,896,947, issued to F. Leenhouts, on Jan. 30, 1990, entitled "Liquid Crystal Display Cell", hereinafter refer to as Leenhouts. Leenhout is designed for transmissive displays with NW operation to generate an electro-optical characteristic with a very slow slope for easy implementation of grey levels. Accordingly, Leenhouts is not concerned with reflective displays operating in the NB mode where it is not desirable to have electro-optical characteristics with a very slow slope. Optimizing brightness for the NW Leenhouts display is different from Optimizing brightness for NB displays.

The fourth row of Table I, referred to as Te Velde, is described in U.S. Pat. No. 4,999,619, issued to T. S. Te Velde et al., on Mar. 12, 1991, entitled "Electro-Optic Display Device for Use in the Reflection Mode", hereinafter refer to as Te Velde. The Te Velde display operates in the NW condition which usually requires much higher operating voltages than NB displays. In addition, the values of parameters φ, β, and dΔn disclosed in Te Velde are completely different from corresponding values of the inventive display shown in the last row of Table I.

The fifth row of Table I, referred to as Sonehara, is described in U.S. Pat. No. 5,105,289, issued to T. Sonehara et al., on Apr. 14, 1992, entitled "Reflective Type Electro-optical Device and a Projection Type Display Apparatus Using the Same", hereinafter refer to as Sonehara. Sonehara has the disadvantage of requiring high operating voltages to achieve a dark state for NW mode and a poor cell-gap margin for the NB mode. In addition, Sonehara has completely different values for φ and dΔn as compared to the inventive display shown in the last row of Table I.

The sixth row of Table I, referred to as Okumura, is described in U.S. Pat. No. 5,139,340, issued to O. Okumura, on Apr. 18, 1992, entitled "Single Polarizer, Reflective Type Liquid Crystal Display Device with High Brightness and Contrast Ratio", hereinafter refer to as Okumura. Okumura has a completely different value for the initial angle β as compared to the inventive display shown in the last row of Table I. In addition, Okumura uses a single polarizer equivalent to having a parallel polarizer and analyzer to achieve a NW display.

The present invention relates to polarization dependent TNLC cells and displays, e.g., projection displays, using reflective SLMs such as the display 500 shown in FIG. 5. Illustratively, parameters values for the inventive display are shown in the last row of Table I.

SUMMARY OF THE INVENTION

The object of the present invention is to provide a twisted nematic liquid crystal (TNLC) cell and a display having polarization dependency used with reflective spatial light modulators (SLMs) that eliminate the problems of conventional TNLC cells and displays.

Another object of the present invention is to provide a TNLC cell that operates at low voltages, for example, below 3 volts, thus reducing power consumption and operating costs, and increasing operating time between replacement or charging of batteries in portable displays.

A further object of the present invention is to provide a TNLC cell that has a high brightness and high contrast ratio.

A still further object of the present invention is to provide a TNLC cell that has a large cell gap margin thus simplifying fabrication thereof.

The present invention accomplishes the above and other objects by providing a twisted nematic liquid crystal (TNLC) cell. The TNLC cell includes front and rear substrates, and a TNLC material having a thickness d and a twist angle φ. The TNLC material is sandwiched between the front and rear substrates and the twist angle φ is approximately from 46° to 62°. A direction of directors of the TNLC material located nearest the front substrate forms an initial angle β with a direction of linearly polarized light incident thereon. The initial angle β is approximately from −6° to 6°. A birefringence Δn of the TNLC material times the thickness d is approximately between 0.7λ to 1.25λ, where λ is a wavelength of light incident on the front substrate.

Another embodiment of the present invention includes a display that has a reflective spatial light modulator (SLM) that includes the TNLC cell. The display has a light source which outputs light; a polarizing beam splitter (PBS) which splits the light from the light source into two linearly polarized lights having first and second polarization directions; and a reflective spatial light modulator (SLM) which receives the linearly polarized light having the first polarization direction, and reflects an image forming light having the second polarization direction onto a screen through the PBS. Illustratively, a projection lens located between the PBS and the screen projects the image forming light onto the screen.

The PBS is configured as a crossed polarizer and analyzer. The polarizer provides the linearly polarized light having the first polarization direction to the SLM, and the analyzer receive the image forming light having the second polarization from the SLM. Illustratively, the first and second polarization directions are substantially perpendicular to each other.

The inventive TNLC cell and display have high brightness, high contrast ratio, large cell-gap margin for easy fabrication, and low operating voltages for low cost and low power consumption.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 5:
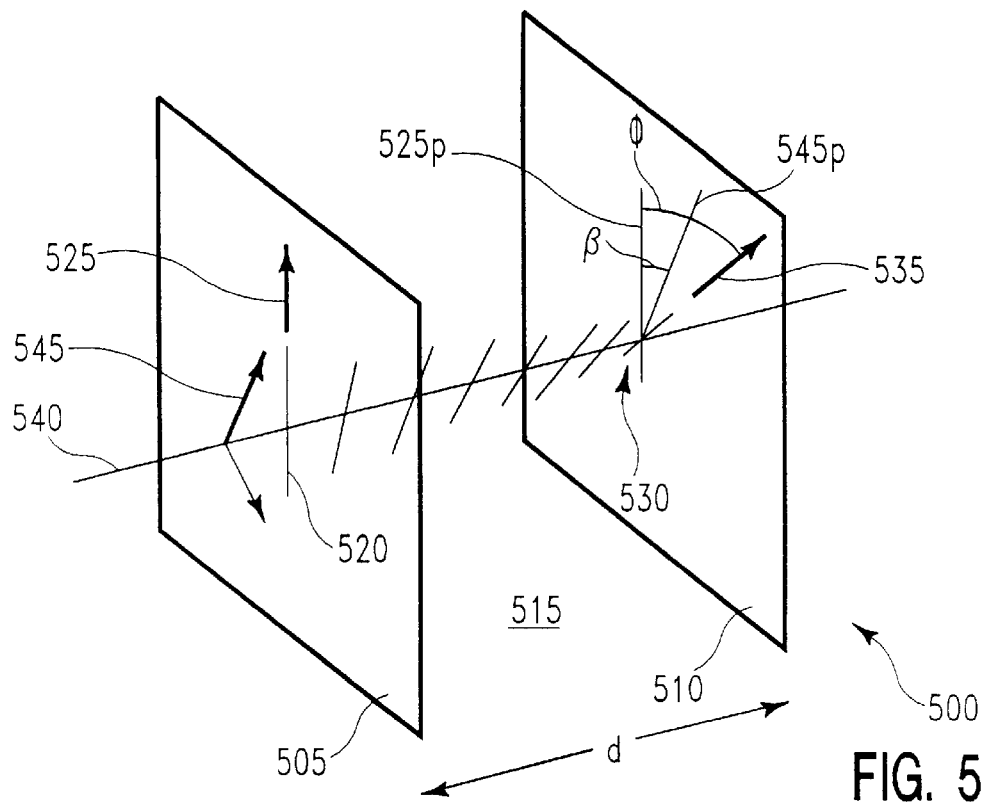
FIG. 5 is a perspective view of a conventional reflective twisted nematic liquid crystal cell (TNLC) showing the polarization direction of incident light with respect to the LC directors.
Figure 6:
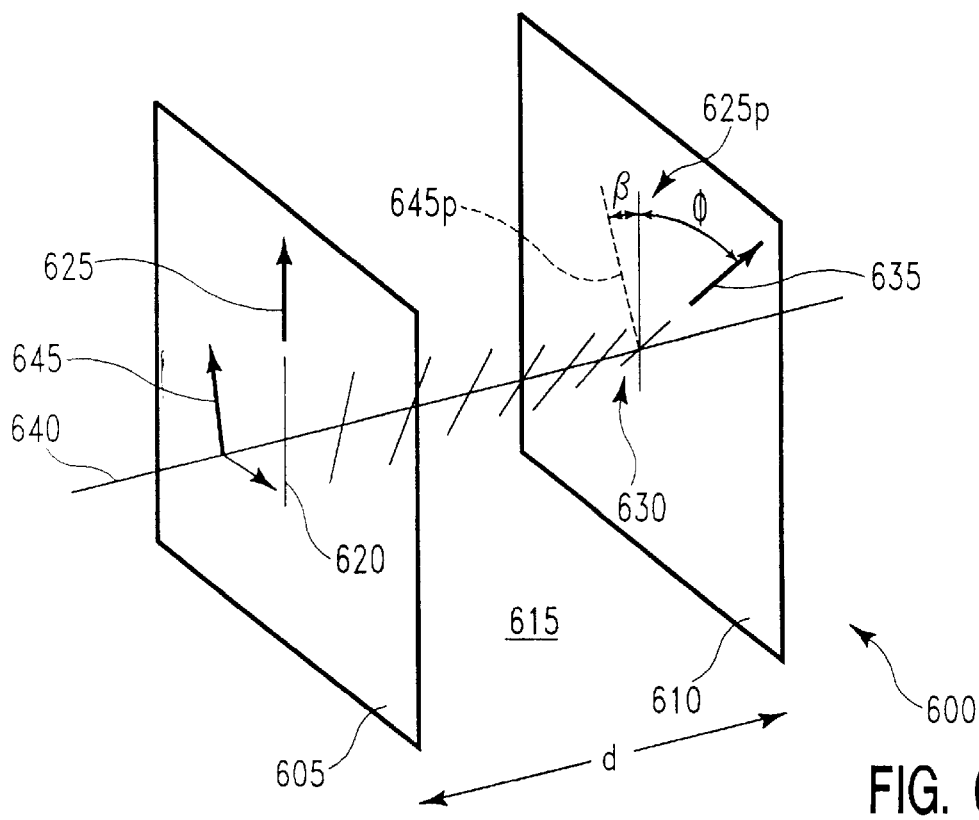
FIG. 6 is a perspective view of a TNLC cell used in reflective SLMs showing the polarization direction of incident light with respect to the LC directors according to the present invention.
Figure 7:
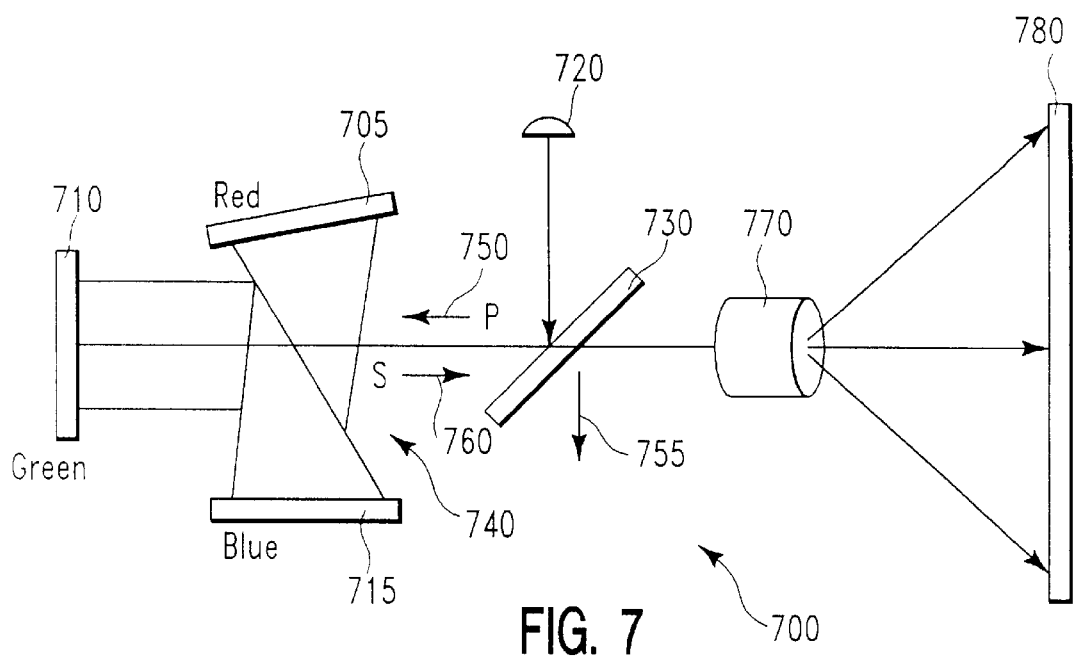
FIG. 7 shows an optical system having three reflective SLMs with polarization dependent TNLC material according to the present invention.

FIG. 6 is a perspective view of a TNLC cell 600 used in reflective SLMs of displays, such as a projection display 700 shown in FIG. 7. As described in connection with the conventional TNLC cell 500 of FIG. 5, the TNLC cell 600 has a front substrate 605 and a rear substrate 610 to house a nematic LC medium or material 615 therebetween. To enhance the twist of the TNLC medium 615, an organic chiral material is mixed therewith. Illustratively, the organic chiral material has an induced chiral angle which is substantially less than or equal to the twist angel $\phi$ of the TNLC material 615. For example, both the chiral agent and the TNCL material 615 have a left-handed twist.

The front and rear substrates 605, 610 of the TNLC cell 600 are parallel to each other, for example. Between the front substrate 605 and the nematic LC medium 615, there are at least two layers of thin films (not shown). One of the two thin films is a transparent conducting electrode made of indium-tin-oxide (ITO), for example, and the other thin film is a front alignment layer made of organic material, such as polyimide. The polyimide alignment film is located between the ITO electrode and the LC medium 615 and aligns a boundary nematic LC director 620 along a specific direction 625. The boundary nematic LC director 620 is the LC director nearest the front alignment layer.

Similarly, between the rear substrate 610 and the nematic LC medium 615, there are at least two layers of thin films (not shown). The thin film adjacent the rear substrate 610 is a reflective conducting pixel electrode made of aluminum (Al) or its alloys, for example. The other thin film, located between the pixel electrode and the LC medium 615, is a rear alignment layer made of organic material, such as polyimide. This rear polyimide alignment film aligns a boundary nematic LC director 630 along a specific direction 635. The boundary nematic LC director 630 is the LC director nearest the rear alignment layer.

The nematic LC medium 615 has a total thickness, d, and the nematic LC directors twist along an axis 640 which is perpendicular to the planes of the front and rear substrates 605, 610. That is, moving along the axis 630 from the front substrate 605 toward the rear substrate 610, the TNLC directors twist by an acute angle $\phi$ from the direction 625 of the front boundary LC director 620 to the direction 635 of the rear boundary LC director 630. Illustratively, the twist direction is a right-handed sense between the front substrate 605 and the rear substrate 610.

The twist angle $\phi$ is shown in FIG. 6, on the rear substrate 610, as the angle between the direction 635 of the rear boundary LC director 630 and a projection 625p on the rear substrate 610 of the front boundary LC director's direction 625. Illustratively, the twist angle $\phi$ is between 46° to 62°.

Upon application of a voltage across the front and rear electrodes, which creates an electric field across the TNLC material 615, the TNLC directors tilt. For example, instead of being in a plane parallel to the plane of the front substrate 605, the front boundary director 620 tilts by a tilt angle to be in a different plane than the front substrate plane.

Illustratively, the pretilt angle $\alpha$ of the TNLC material 615 is less than 15°. Note, the boundary LC directors 620 and 630, shown in FIG. 6, are tilted by the pretilt angle $\alpha$ in the absence or presence of an electric field because they are rigidly anchored on the substrate surfaces 505, 510. The electric field only deforms the LC directors in the middle region of the cell 600. The boundary LC directors 620, 630 are not deformed by the electric field because they are strongly anchored on the substrate surfaces 605, 610.

FIG. 6 also shows an incident light beam which is linearly polarized along a polarization direction 645 and has a central wavelength $\lambda$. The angle between the polarization direction 645 and the front boundary LC director 625, referred to as the initial angle and designated as $\beta$, is shown on the rear substrate 610 as the angle between the rear substrate projections 625p, 645p of the front boundary LC director 625 and the incident light polarization direction 645, respectively.

The sign of the initial angle $\beta$ is positive along a clockwise direction from the rear substrate projection 625p of the front boundary LC director 625 and the direction 635 that defines the acute twist angle $\phi$ therebetween, as viewed from the front of the TNLC cell 600. In the counter-clockwise direction, as viewed from the front of the conventional TNLC cell 600, the angle $\beta$ is negative. For example, the initial angle $\beta$ is positive if it is an acute angle and lies within the twist angle $\phi$, and negative if it lies at the opposite direction and outside of the twist angle $\phi$. For illustration purposes, the initial angle $\beta$ shown in FIG. 6 is negative. Illustratively, the angle $\beta$ is from −6° to +6°.

The TNLC cell 600 is configured to operated in a normally black mode (NB) since the operating voltage is typically less than that for a normally white mode (NW). In the NB mode, the TNLC cell 600 is dark in the absence of an electric field across it. Upon application of a voltage or potential difference between the pixel and counter-electrodes, the resulting electric field across the TNLC material 615 increases brightness of the TNLC cell 600.

Figure 1:
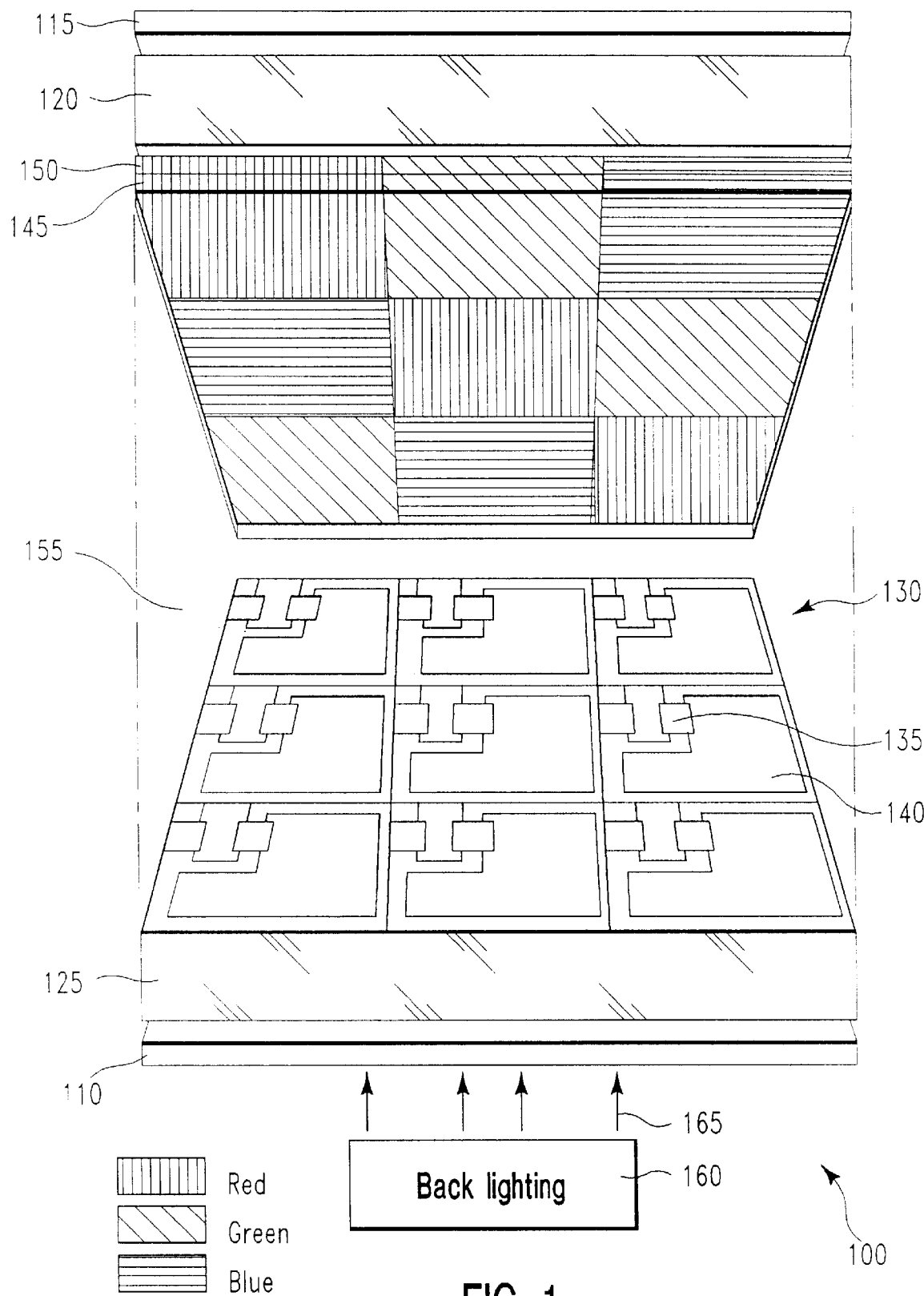
FIG. 1 shows a conventional liquid crystal display (LCD) having transmissive spatial light modulators (SLMs)
Figure 2:
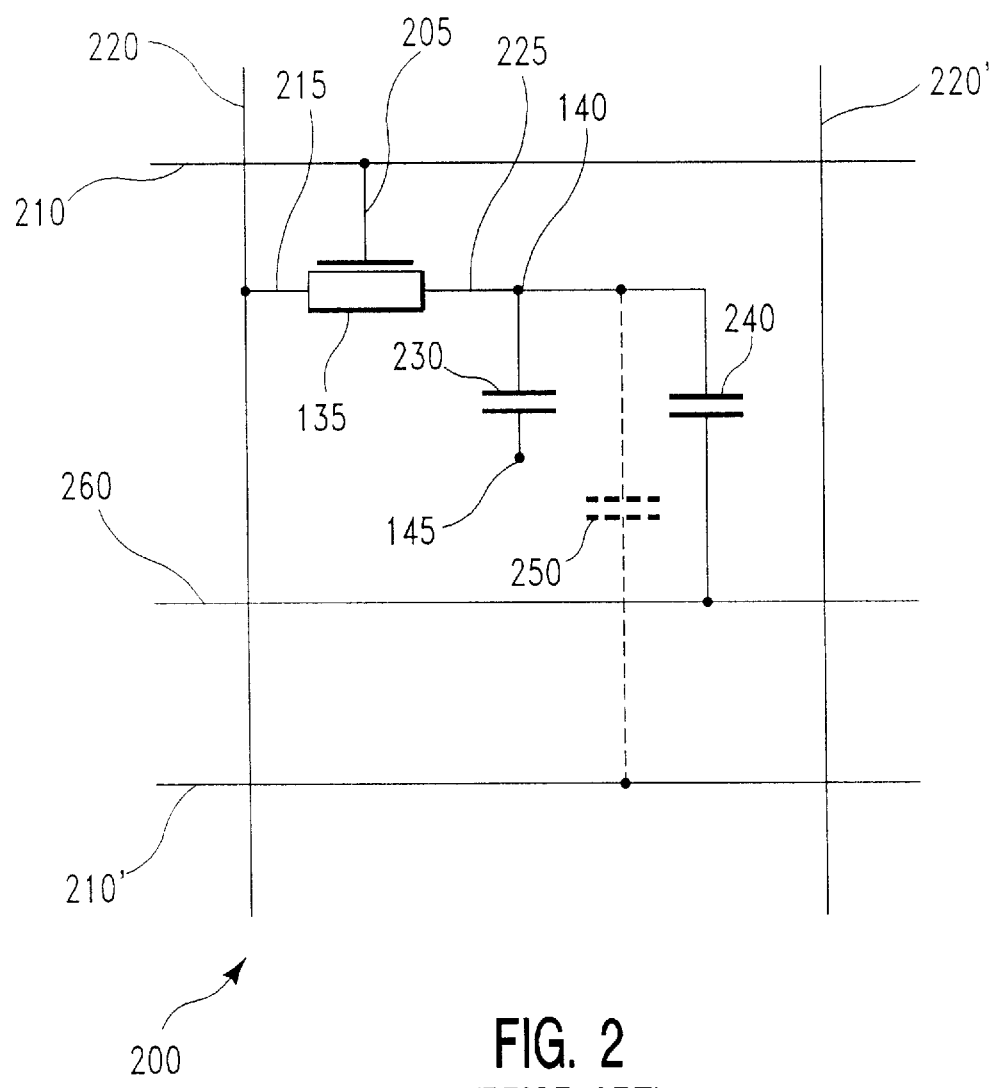
FIG. 2 shows an equivalent circuit of a pixel of the conventional LCD shown in FIG. 1.
Figure 3:
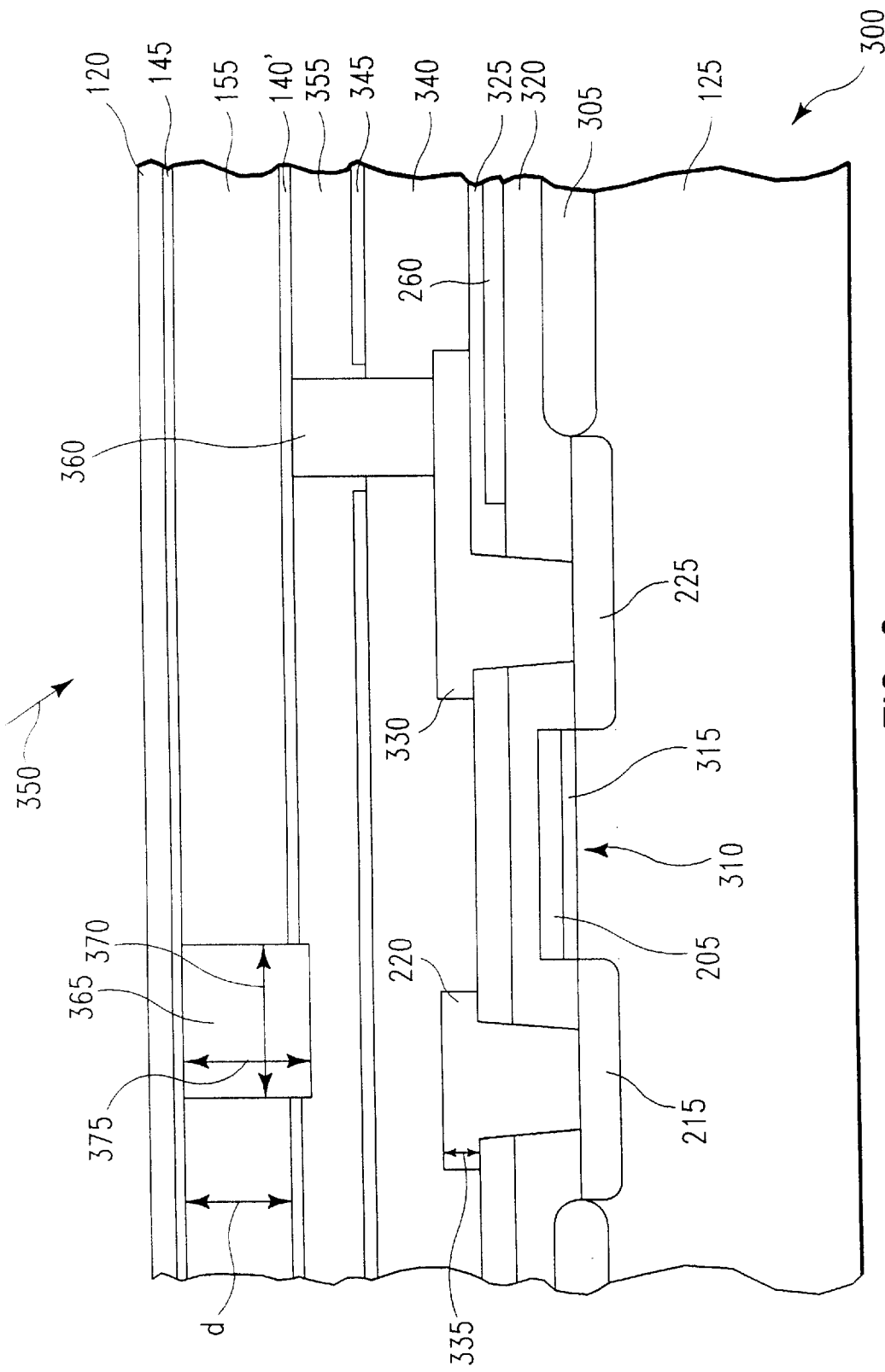
FIG. 3 shows a cross sectional view of a single reflective liquid crystal light valve or SLM of a conventional reflective LCD.
Figure 4:
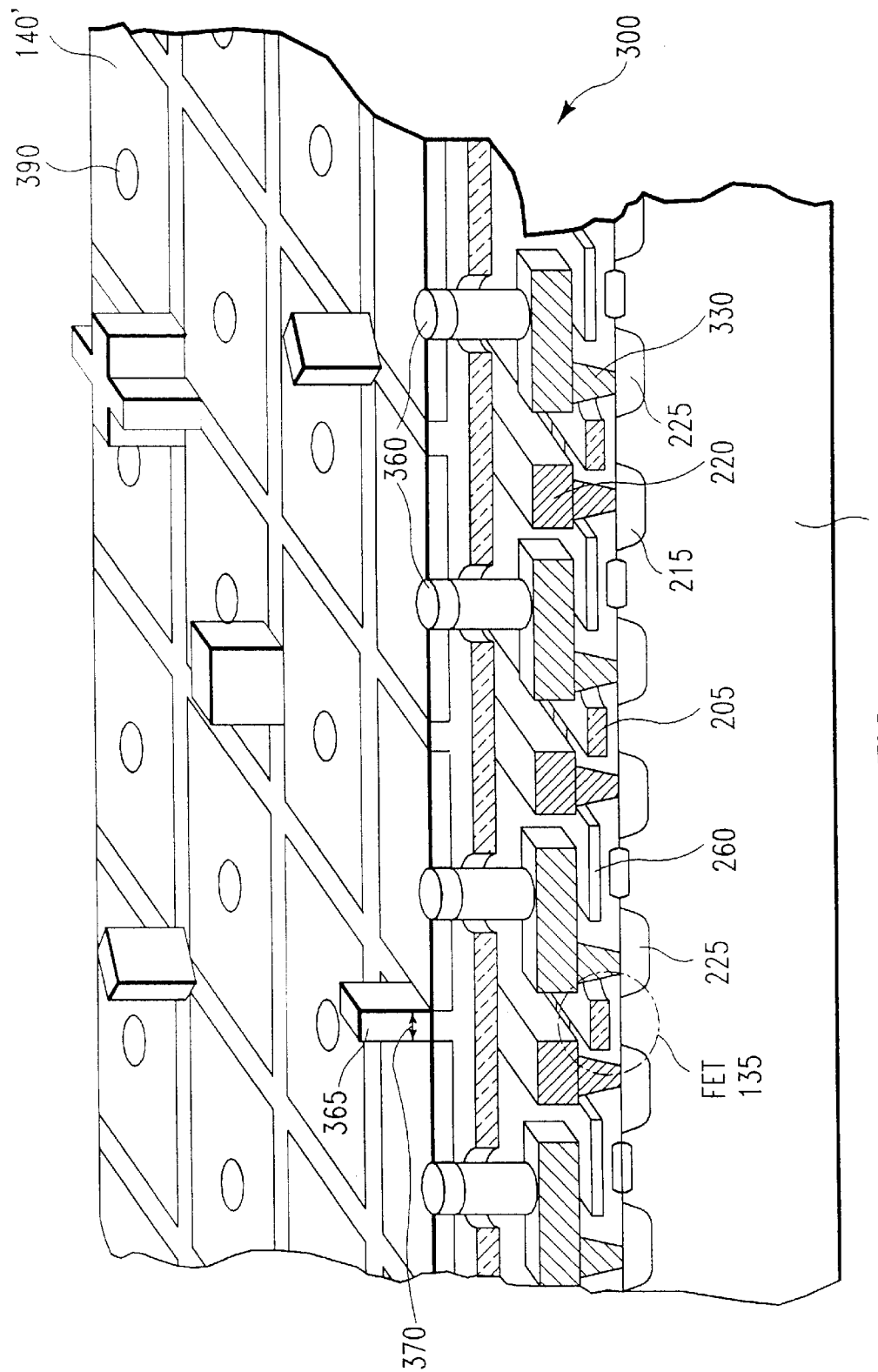
FIG. 4 is a perspective view of the conventional reflective LCD shown in FIG. 1 showing an array of the reflective liquid crystal (LC) SLMs.

The TNLC cell 600 is also configured to operate in a reflective spatial light modulator (SLM) and a display having a polarizer and an analyzer which are crossed. The TNLC cell 600 changes the polarization of incident light. For example, the polarization direction of the light incident of the front substrate 605 of the TNLC cell 600 is substantially perpendicular to the polarization direction of light emerging from the front substrate 605 upon reflection from the pixel electrode located near the rear substrate 610. Note, this reflective pixel electrode is equivalent to the pixel electrode 140' shown in FIGS. 3–4. The front and rear substrates 605, 610 in FIG. 6 are similar to the front and rear substrates 120, 125 in FIGS. 3–4, respectively.

FIG. 7 shows a color optical system or display 700 having three reflective SLMs 705, 710, 715. A light source 720 provides a light which is linearly polarized by a polarizer (not shown). The linearly polarized light is directed to a polarizing beam splitter (PBS) 730.

One polarization of the linearly polarized light, e.g., the p-polarization, is reflected by the PBS 730 and enters a color separation prism 740. The other polarization of the linearly polarized light from the polarizer, e.g., the s-polarization 755, passes through the PBS 730 and is discarded.

The color separation prism 740 splits the light into three primary colors, e.g., red (R), green (G), and blue (B) and directs them to a respective SLM. Illustratively, the red component of light is directed to the first SLM 705, the green to the second SLM 710, and the blue to the third SLM 715. Each SLM 705, 710, 715 is a reflective SLM that contains the TNLC material 615 of the TNLC cell 600 (FIG. 6) located between a matrix of reflective pixel electrodes and a common transparent counter-electrode, similar to that described in connection with FIG. 3–4.

The brightness of the light is modulated by each reflective-type liquid crystal light valve or SLM 705, 710, 715 according to a voltage applied to each sub-pixel. In a color optical system, each pixel of one SLM is referred to as a sub-pixel of the color image to be formed, where three sub-pixels of red, green and blue of the respective SLMs 705, 710, 715 form one color pixel of the image.

Upon reflection from the pixel electrodes of the respective SLMs 705, 710, 715, the red, green and blue components of light enter the color separation prism 740. Due to the chosen parameters and configuration of TNLC material 615, the polarization of light exiting each SLMs 705, 710, 715, is rotated by approximately 90° with respect to the polarization of light that entered each SLMs. Thus, the p-polarized light color component of light, from the color separation prism 740, entering the SLMs 705, 710, 715, upon reflection therefrom, become s-polarized and enters the color separation prism 740 from the SLMs 705, 710, 715.

The color separation prism 740 recombines the s-polarized color components of light reflected from the SLMs 705, 710, 715 and provides s-polarized white light to the PBS 730. The p-polarized light incident on the SLMs 705, 710, 715 is shown as reference numeral 750, while the s-polarized light from the light source 720 that passes through the PBS and is discarded is shown as numeral 755. The p-polarized light 750 undergoes rotation as it travels through the TNLC material, which is deformed by an applied electrical field, and reflects from the SLMs 705, 710, 715, to form the s-polarized, which is shown as reference numeral 760 in FIG. 7.

Because the polarization directions of light incident and reflected from the SLMs are perpendicular to each other, the PBS 730 acts as a polarizer and an analyzer which are crossed. For example, the polarizer provides the p-polarized light 750, and the analyzer receives the s-polarization 760 light, which is rotated by 90° relative to the p-polarized light 750. This s-polarized white light 760 passes through the PBS 730 and enters a projection lens 770, which enlarges and projects the image output from the reflective SLM 705, 710, 715 on a screen 780.

The TNLC cell 600 is a polarization dependent TNLC device which is incorporated into the reflective SLMs 705, 710, 715 of the projection display 700. Illustratively, the TNLC material 615 belongs to the family of HFE modes and has a positive dielectric anisotropy. Dielectric anisotropy is defined as the difference in dielectric constants parallel $\epsilon_{\parallel}$ and perpendicular $\epsilon_{195}$ to the LC director. The dielectric anisotropy is positive when the dielectric constant along or parallel to the LC director is larger than the dielectric constant perpendicular to the LC director, i.e., $\epsilon_{81} > \epsilon_{\perp}$.

The TNLC cell 600 of FIG. 6 has optimal brightness and cell-gap margin M. The TNLC cell 600 has a large cell-gap margin M, which is defined as $|\Delta d/d|$ where $\pm \Delta d$ is the maximum cell gap or thickness variation from its thickness d. In addition, the contrast ratio of the TNLC cell 600 is large, for example, larger than 200 to 1 for the optimal cases for different colors of light, as shown in Table II. The optimal brightness and cell-gap margin M of the TNLC cell 600 is achieved by varying the values of $\phi$, $\beta$, and $d\Delta n$ by keeping the pretilt angle $\alpha$ below about 5°, for example.

In order to study the effectiveness of the TNLC cell 600 of FIG. 6 to rotate the linear polarization of light incident on thereon by 90°, for example, an optical efficiency (or polarization conversion efficiency or P-S conversion efficiency) of the TNLC cell 600 is defined as the energy conversion of incident p-wave 750 into the reflected s-wave 760, shown in FIG. 7. Using such a definition, the optical efficiency is not affected by the reflection loss within the TNLC cell 600 because, at normal incidence, both the p-wave 750 and s-wave 760 have the same optical loss upon encountering the same surfaces, such as passing through the ITO common counter-electrode and TNLC material 615, and reflecting from the pixel electrodes located on the rear substrate 610.

Increasing the polarization conversion efficiency also increases the brightness of the display. Using Jones matrix, the polarization conversion efficiency as a function of $d\Delta n/\lambda$ is calculated, given a set values for $\phi$, $\beta$, and $\alpha$.

Figure 8:
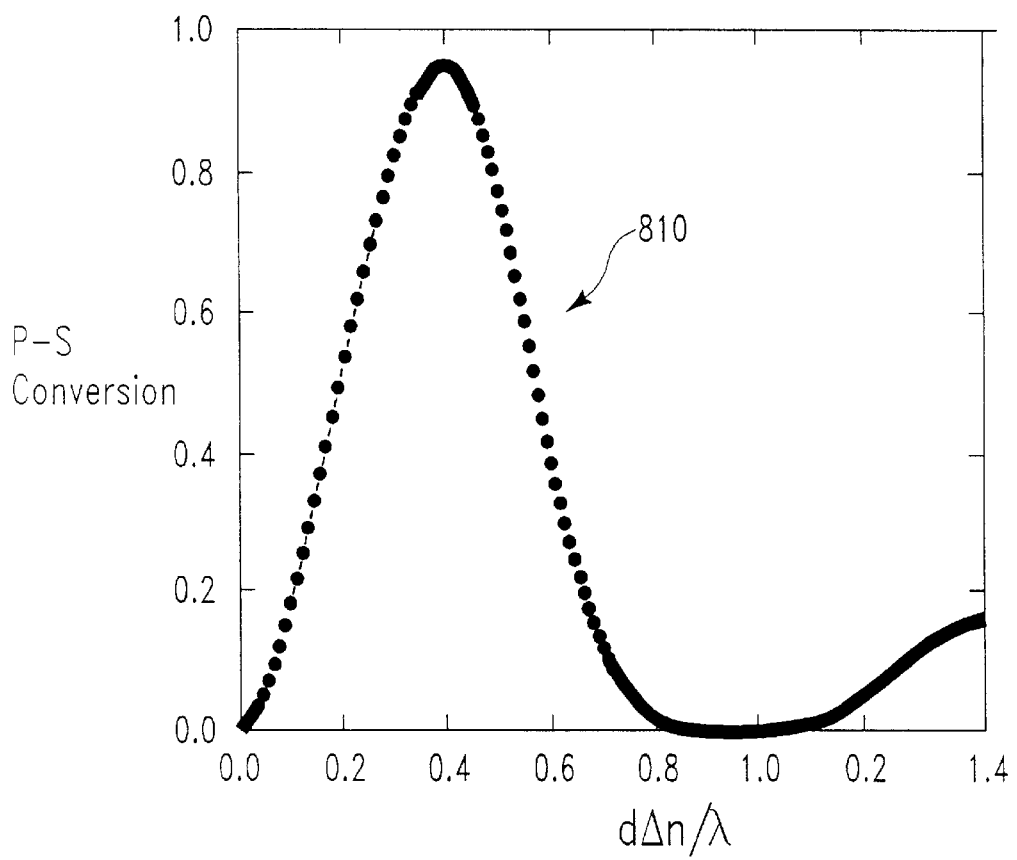
FIG. 8 is a plot of the polarization conversion efficiency as a function of dΔn/λ for the TNLC cell shown in FIG. 6 with a twist angle φ of 54° according to the present invention.

FIG. 8 is a curve 810 that shows the results of such calculations using $\phi=54°$, and $\beta=\alpha=0°$. For the NB mode, the dark state should be as dark as possible. From curve 810, it is seen that a very dark state for the TNLC cell or display is achieved when $d\Delta n/\lambda=0.954$, where the p-s conversion or optical efficiency is low at almost zero. The value 0.954 for $d\Delta n/\lambda$ is derived from curve 810 using the relationship shown in equation (1) described below, namely, $$d\Delta n/\lambda \approx \sqrt{1 - \left(\frac{\phi}{\pi}\right)^2}.$$

Thus, for a very dark state, the cell gap thickness d of the TNLC cell 600 is equal to $0.954\lambda/\Delta n$, where $\lambda$ is the wavelength of light from the light source 720, shown in FIG. 7, and $\Delta n$ is the birefringence (the difference between the indices of refraction of the extra-ordinary ray and the ordinary ray) of the TNLC medium 615 (FIG. 6).

The curve 810, shown in FIG. 8, indicates that the value of the cell-gap margin M is 0.126, where $M=|\Delta d/d|$. The value for cell-gap margin M of 0.126 is derived from curve 810 as follows: $d=0.954\lambda/\Delta n$, and $\Delta d$ is the variation of cell gap from the value of d to have a contrast ratio larger than 200 to 1. To calculate the contrast ratio, the peak P-S conversion efficiency of an LC cell, with the cell gap d under various applied voltages, is divided by the corresponding dark-state P-S conversion efficiency following the curve 810 shown in FIG. 8. The peak P-S conversion efficiency of a 54°-twist reflective cell is 1, as shown in curve 830 of FIG. 9.

Based on the curve 810, the polarization conversion efficiency is obtained when a voltage is applied across the TNLC cell 600 because the twist is no longer uniform across the TNLC cell 600. Therefore, in order to determine the maximum polarization conversion efficiency of a particular design, where the values of $\phi$, $\beta$, $\alpha$, and $d\Delta n/\lambda$ have been chosen, the polarization conversion efficiency of the particular TNLC cell is determined as a function of the applied voltage across the TNLC cell. In doing so, the non-uniform twist and tilt of the LC directors across the TNLC cell is taken into account.

By keeping the pretilt angle $\alpha$ below 5°, the maximum polarization conversion efficiency for the field-on states is determined as a function of the twist angle $\phi$ and the initial angle $\beta$. For illustrative purposes, it is assumed that $\beta<5°$. Given a twist angle $\phi$, the cell gap d is determined according the equation (1):

$$d \approx \frac{\lambda}{\Delta n}\sqrt{1 - \left(\frac{\phi}{\pi}\right)^2} \tag{1}$$

Illustratively, the cell gap of the TNLC cell 600, shown in FIG. 6, varies from 0.7d to 1.25d.

Figure 9:
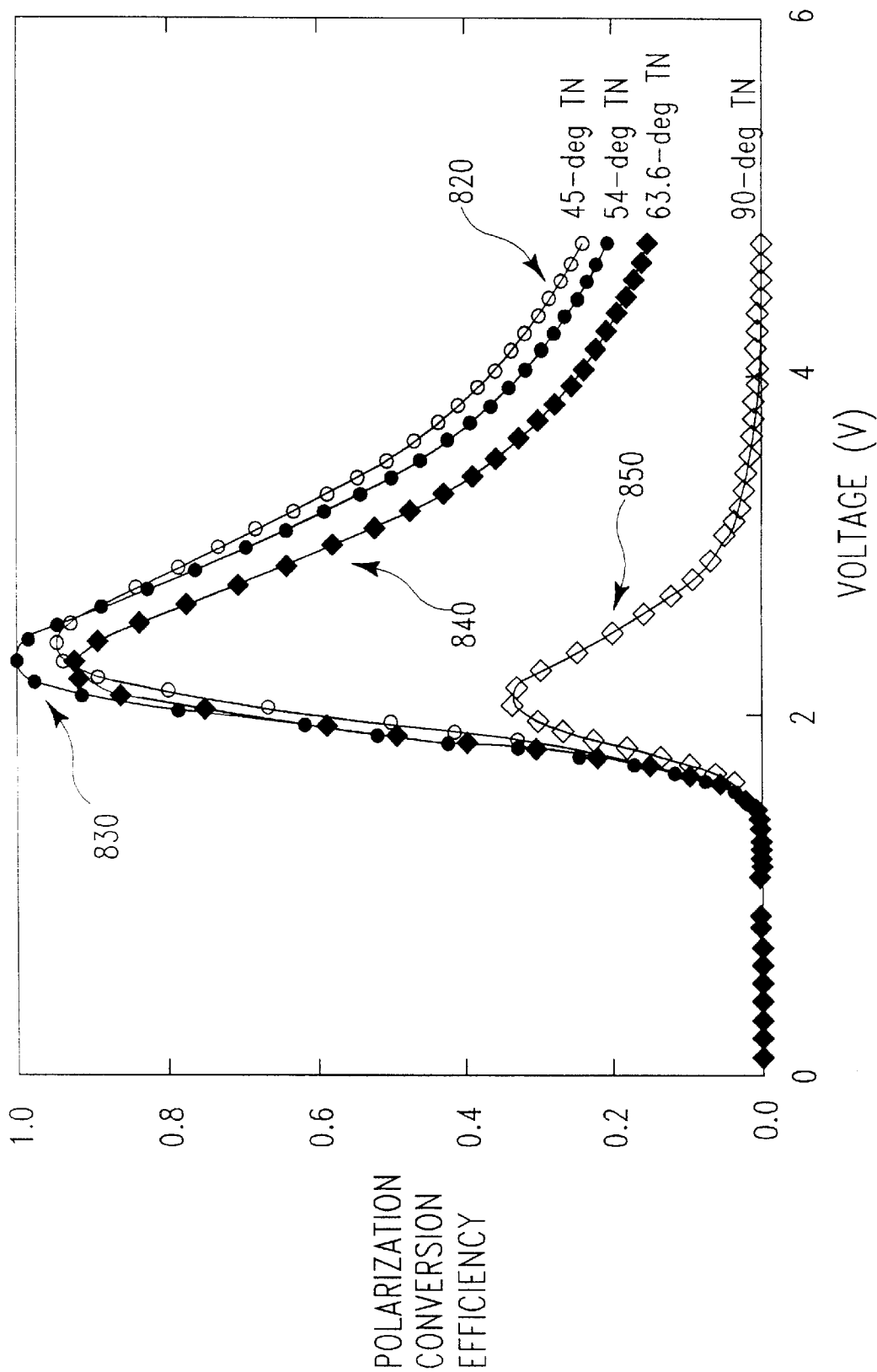
FIG. 9 is a plot of the polarization conversion efficiency as a function of applied voltage for the TNLC cell shown in FIG. 6 with different twist angles φ ranging from of 45° to 90° according to the present invention.

FIG. 9 shows the polarization conversion efficiency as a function of the applied voltage across the TNLC cell, where curves 820, 830, 840, and 850 are for the cases of ($\phi$, $d\Delta n/\lambda$)=(45°, 0.968), (54°, 0.954), (63.6°, 0.935) and (90°, 0.866), respectively. The curve 830, with a twist angle of 54°, has a peak polarization conversion efficiency of approximately 100%, whereas the peak polarization conversion efficiency of curve 820 is approximately 93%. That is, the peak polarization conversion efficiency of curve 830 is approximately 7% larger than the peak polarization conversion efficiency of curve 820, which is for a twist angle φ of 45°. This result is not expected by Boswell, Bleha, and Leenhouts.

Figure 10:
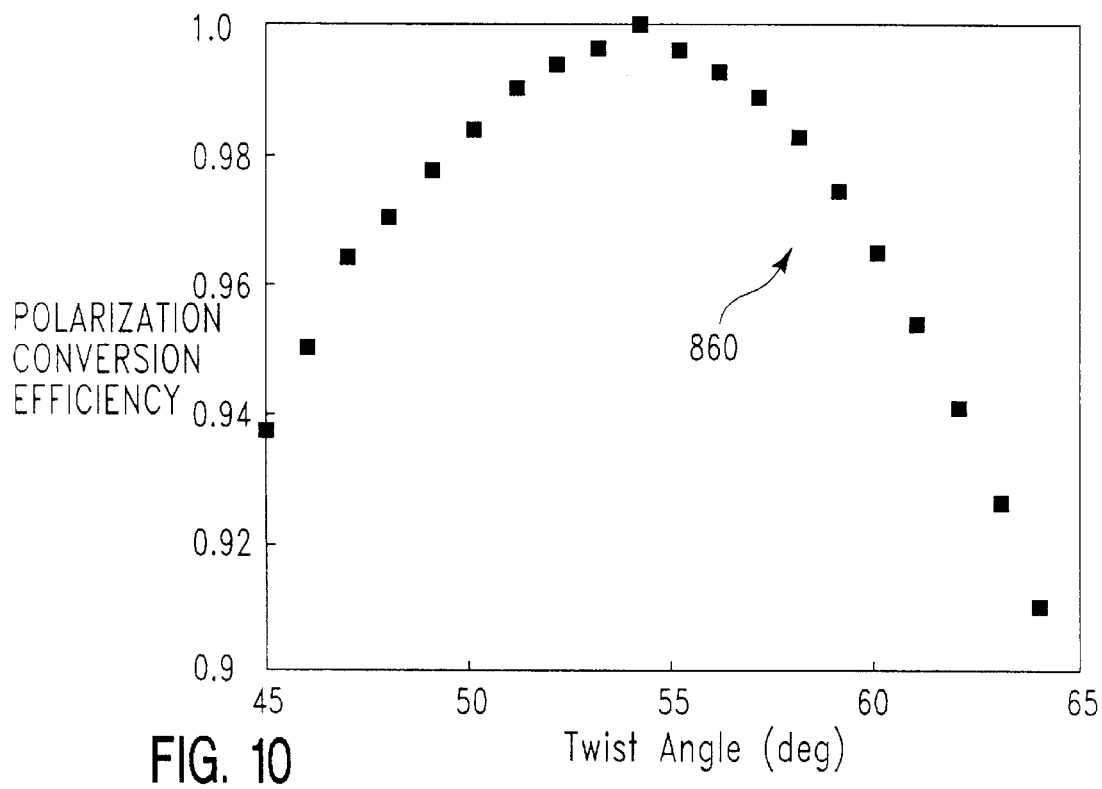
FIG. 10 is a plot of the maximum polarization conversion efficiency as a function of twist angle φ for the TNLC cell shown in FIG. 6 according to the present invention.

Using the same method, it was determined that the polarization conversion efficiency as a function of twist angle has a peak value at a twist angle of 54° as shown by curve 860 of FIG. 10. It was also determined that, at a twist angle ranging from 46° to 62, i.e., 46°<φ<62°, and an initial angle ranging from 6° to −6°, i.e., −6°<β<6°, the reflective twisted nematic LC cell 600 exhibits a high brightness and contrast ratio, a large cell-gap margin, and a low operating voltage. Illustratively, the operating voltage is approximately below 3 volts.

In addition, by changing β away from 0°, the range of dΔn/λ for a high contrast ratio shifts and the cell-gap margin increases. When β<0°, the shift is to lower values and, when β>0°, the shift is to larger values. At β=−6°, the optimal value of dΔn/λ to achieve a high contrast ratio shifts from 0.954 to 0.867 and the cell gap margin increases more than 15% as compared to the case where dΔn/λ=0.954 and β~0°.

At β=6°, the optimal value of dΔn/λ to achieve a high contrast ratio shifts from 0.954 to 1.072 and the cell gap margin increases more than 15% as compared to the case where dΔn/λ=0.954 and β~0°. This indicates that, by selecting an appropriate TNLC mixture with a proper value of dΔn and by properly orienting them to change the value of the initial angle β, the three SLMs 705, 710, 715 shown in FIG. 7 can have identical parameters, such as an identical cell gap d, for incident light of different color-bands, i.e., different wavelengths λ, and still achieve optimal conditions, such as optimal image brightness and contrast.

The following is an example of an implementation of the present invention. A twisted nematic cell was made using orientation (or alignment) layers on both the ITO and Al electrodes of the front and rear substrates 605, 610 (FIG. 6), respectively, that are rubbed polyimide films made of polyimide resin AL3046 provided by Nissan Chemical Industries, LTD., Japan.

Figure 11:
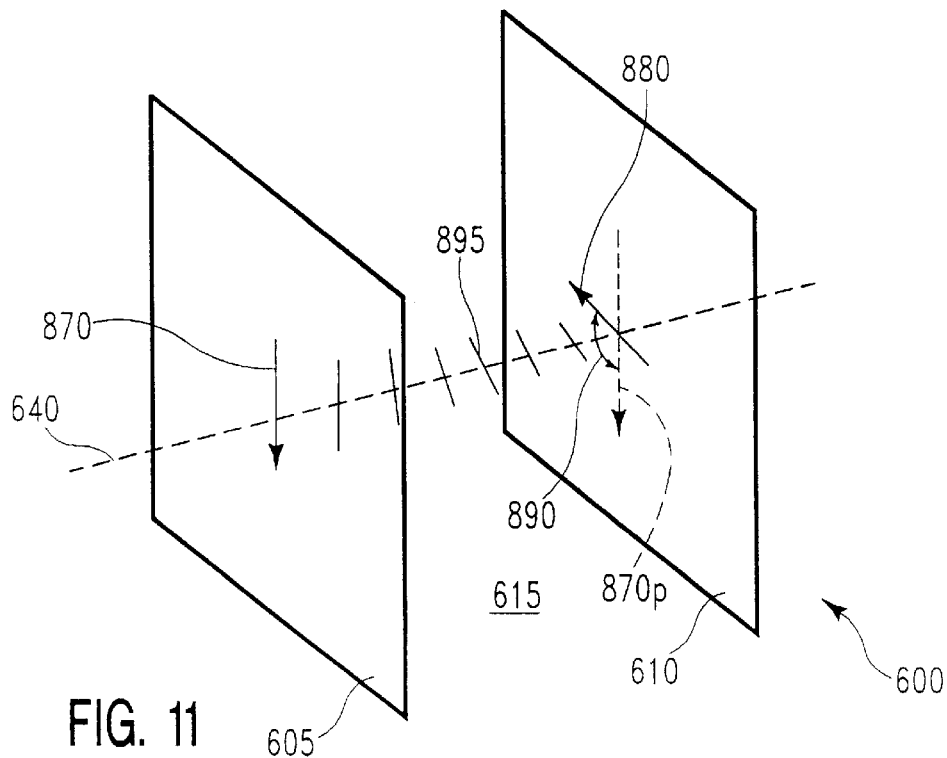
FIG. 11 shows the rubbing directions on polyimide alignment films to form a twist angle of approximately 54° for the TNLC cell shown in FIG. 6 according to the present invention.

FIG. 11 shows the rubbing direction on both cell substrates 605, 610 of the TNLC cell 600 that contain the TNLC medium 615. The rubbing directions on the polyimide film coated on the front substrate 605 is along the arrow 870. The rubbing direction on the polyimide film coated on the rear substrate 610 is along the arrow 880.

The angle between the arrows 880 an 870 is approximately 126°. This angle is equivalent to the angle 890 between the rear rubbing direction 880 and arrow 870p, which is the projection of the front rubbing direction 870 onto the rear substrate 610.

The LC directors 895 twist left-handed between the rear substrate 610 and the front substrate 605 with a total twist angle φ of approximately 54°. The LC directors adjacent to the rear substrate 610 are aligned along the arrow direction 880, and the LC directors adjacent to the front substrate 605 are aligned opposite to the arrow direction 870. Alternatively, the LC directors 895 twist right-handed to form a right-handed twisted LC medium with a total twist angle of 54°.

To enhance the left-handed twist of the LC medium 615, a small amount of left-handed chiral agent S1011 from E. Merck, Darmstadt, Germany, is added into the nematic mixture TL222. The cell gap d was maintained at 2.7 μm by using SiO$_2$ posts as spacers on one of the substrates. A nematic mixture TL222 from E. Merck, Darmstadt, Germany was vacuum-injected into the LC cell after it was assembled.

For measurements of the contrast ratio and the polarization conversion efficiency, a linearly polarized light was used centered at 530 nm (green) and 630 nm (red), with its polarization direction incident on the TNLC cell 600 arranged for various values of the initial angle β, in particular, for β=0°, 4°, and −4°. An entrance window that allows the light to enter the TNLC cell 600 was coated with an anti-reflection coating having a reflectivity of about 0.5% for both the red and green lights.

The contrast ratio and polarization conversion efficiency values were measured as a function of the applied voltage. Peak values occurred at a voltage of about 2.4 volts. The measured results are tabulated at Table II for different values of β at the optimal twist angle φ of 54° for green and red lights.

TABLE II

| φ | β | contrast ratio (red) | contrast ratio (green) | polarization conversion |
|---|---|---|---|---|
| 45° | 0° | 230 to 1 | 50 to 1 | 0.91 (red) |
| 54° | 0° | 300 to 1 | 50 to 1 | 0.98 (red) |
| 54° | −4° | 170 to 1 | 10 to 1 | 0.97 (red) |
| 54° | 4° | 50 to 1 | 230 to 1 | 0.97 (green) |

From Table II, it is seen that red incident light can be used at β from −4° to 0°, or green incident light at β~4° to achieve high contrast ratio and high polarization conversion efficiency for the TNLC cell used in these measurement, which cell also has a large cell-gap margin.

As a counter example, a similar TNLC cell was made except that the twist angle φ was 45° instead of 54°. The contrast ratio and the polarization conversion efficiency of the 45° twist cell was measured as a function of the applied voltage at β from −4° to 4°. The peak polarization conversion efficiencies for red and green incident lights were approximately 0.91 occurring at a voltage about 2.3 volts. The measured results for the case β~0° is also tabulated in Table II for comparison purposes.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. A twisted nematic liquid crystal (TNLC) cell comprising:

front and rear substrates; and a TNLC material having a thickness d and a twist angle φ, said TNLC material being sandwiched between said front and rear substrates wherein said twist angle φ being approximately from 46° to 62° and wherein a direction of directors of said TNLC material located nearest said front substrate forms an initial angle β with a direction of linearly polarized light incident thereon said initial angle β being approximately −6° to 60°, zero being noninclusive.

2. The TNLC cell of claim 1, wherein a birefringence Δn of said TNLC material times said thickness d is between approximately 0.7λ to 1.25λ, where λ is a wavelength of light incident on said front substrate.

3. The TNLC cell of claim 1, wherein said cell gap d is approximately given by equation $$d \approx \frac{\lambda}{\Delta n} \sqrt{1 - \left(\frac{\phi}{\pi}\right)^2},$$

where Δn is a birefringence of said TNLC material and λ is a wavelength of light incident on said front substrate.

4. The TNLC cell of claim 1 further comprising a front alignment layer formed between said TNLC material and said front substrate and a rear alignment layer formed between said TNLC material and said rear substrate, wherein a rubbing direction of said front alignment layer and a rubbing direction of said rear alignment layer form a rubbing angle to provide said twist angle φ.

5. The TNLC cell of claim 4, wherein said rubbing angle is approximately 126 degrees.

6. The TNLC cell of claim 1, wherein said TNLC material has a left handed twist moving from said front substrate to said rear substrate.

7. The TNLC cell of claim 1, wherein said TNLC material has a positive dielectric anisotropy.

8. The TNLC cell of claim 1, wherein said twist angle φ is approximately 54 degrees.

9. The TNLC cell of claim 1 further comprising an organic chiral material mixed with said TNLC material, said organic chiral material having a chiral angle which is substantially equal to the twist angle φ of said TNLC material.

10. A display comprising:
   a light source which outputs light;
   a polarizing beam splitter (PBS) which splits said light from said light source into two linearly polarized lights having first and second polarization directions; and
   a reflective spatial light modulator (SLM) which receives said linearly polarized light having said first polarization direction and reflects an image forming light having said second polarization direction onto a screen through said PBS;
   said SLM including a twisted nematic liquid crystal (TNLC) cell having:
   front and rear substrates; and
   a TNLC material having a thickness d and a twist angle φ, said TNLC material being sandwiched between said front and rear substrates wherein said twist angle φ being approximately from 46° to 62° and wherein a direction of directors of said TNLC material located nearest said front substrate forms an initial angle β with a direction of linearly polarized light incident thereon said initial angle β being approximately −6° to 6°, zero being nonclusive.

11. The display of claim 10, further comprising a projection lens located between said PBS and said screen for projecting said image forming light onto said screen.

12. The display of claim 10, wherein said first and second polarization directions are substantially perpendicular to each other.

13. The display of claim 10, wherein said PBS is configured as a crossed polarizer and analyzer, said polarizer providing said linearly polarized light having said first polarization direction to said SLM, and said analyzer receiving said image forming light having said second polarization from said SLM, said first and second polarization directions being substantially perpendicular to each other.

14. The display of claim 10, wherein a birefringence Δn of said TNLC material times said thickness d is between approximately 0.7λ to 1.25λ, where λ is a wavelength of light incident on said front substrate.

15. The display of claim 10, wherein said cell gap d is approximately given by equation $$d \approx \frac{\lambda}{\Delta n} \sqrt{1 - \left(\frac{\phi}{\pi}\right)^2},$$

where Δn is a birefringence of said TNLC material and λ is a wavelength of light incident on said front substrate.

16. The display of claim 10, wherein said TNLC cell is normally black.

17. The display of claim 10, wherein said SLM operates in a hybrid-field-effect mode.

18. The display of claim 10 further comprising a front alignment layer formed between said TNLC material and said front substrate and a rear alignment layer formed between said TNLC material and said rear substrate, wherein a rubbing direction of said front alignment layer and a rubbing direction of said rear alignment layer form a rubbing angle to provide said twist angle φ.

19. The display of claim 18, wherein said rubbing angle is approximately 126 degrees.

20. The display of claim 10, wherein said TNLC material has a left handed twist moving from said front substrate to said rear substrate.

21. The display of claim 10, wherein said TNLC materials has a positive dielectric anisotropy.

22. The display of claim 10, wherein said twist angle φ is approximately 54 degrees.

23. The display of claim 10 further comprising an organic chiral material mixed with said TNLC material, said organic chiral material having a chiral angle which is substantially equal to the twist angle φ of said TNLC material.

* * * * *

UNITED STATES PATENT AND TRADEMARK OFFICE
CERTIFICATE OF CORRECTION

PATENT NO. : 5,870,164
DATED : February 9, 1999
INVENTOR(S) : Minhua Lu, et al.

It is certified that error appears in the above-identified patent and that said Letters Patent is hereby corrected as shown below:

Title page item [57],

Abstract., line 11: " $60^\circ$ " should read -- $6^\circ$ --

Signed and Sealed this

Twenty-ninth Day of February, 2000

Attest:

Q. TODD DICKINSON

Attesting Officer

Commissioner of Patents and Trademarks